(12) United States Patent
Umemoto et al.

(10) Patent No.: US 6,768,529 B2
(45) Date of Patent: Jul. 27, 2004

(54) REFLECTION-TRANSMISSION DOUBLE TYPE LIQUID-CRYSTAL DISPLAY DEVICE

(75) Inventors: Seiji Umemoto, Osaka (JP); Toshihiko Ariyoshi, Osaka (JP); Hideo Abe, Osaka (JP)

(73) Assignee: Nitto Denko Corporation, Osaka (JP)

( * ) Notice: Subject to any disclaimer, the term of this patent is extended or adjusted under 35 U.S.C. 154(b) by 262 days.

(21) Appl. No.: 09/748,212

(22) Filed: Dec. 27, 2000

(65) Prior Publication Data

US 2001/0007489 A1 Jul. 12, 2001

(30) Foreign Application Priority Data

Dec. 27, 1999 (JP) ........................................ P. 11-369712

(51) Int. Cl.$^7$ .............................................. G02F 1/1335
(52) U.S. Cl. ........................................ 349/114; 349/67
(58) Field of Search .......................... 349/113–114, 61, 349/64–65, 112; 362/26–30

(56) References Cited

U.S. PATENT DOCUMENTS

| | | | |
|---|---|---|---|
| 5,461,547 A | * 10/1995 | Ciupke et al. | 362/31 |
| 5,598,281 A | 1/1997 | Zimmerman et al. | |
| 5,808,713 A | * 9/1998 | Broer et al. | 349/98 |
| 6,091,469 A | 7/2000 | Naito | |
| 6,266,108 B1 | 7/2001 | Bao et al. | |
| 6,285,426 B1 | 9/2001 | Akins et al. | |
| 6,340,999 B1 | * 1/2002 | Masuda et al. | 349/63 |

FOREIGN PATENT DOCUMENTS

| | | | | |
|---|---|---|---|---|
| EP | 0 957 392 A | 11/1999 | | |
| JP | 5-158033 | 6/1993 | ......... | G02F/1/1335 |
| JP | 11-142618 | * 5/1998 | | |
| JP | 2000-147499 | 5/2000 | ......... | G02F/1/1335 |

OTHER PUBLICATIONS

Patent Abstracts of Japan, vol. 1996, No. 08, Aug. 30, 1996 & JP 08 094844 A (Fujitsu Ltd), Apr. 12, 1996 (abstract).

* cited by examiner

Primary Examiner—Dung Nguyen
(74) Attorney, Agent, or Firm—Sughrue Mion, PLLC

(57) ABSTRACT

A reflection-transmission double type liquid-crystal display device has a transmission type liquid-crystal display panel including a liquid-crystal cell, at least one illuminator disposed on at least one side surface of the liquid-crystal display panel, an optical path changing sheet which has a refractive index exhibiting a refractive index difference of not higher than 0.15 from a refractive index of a nearest liquid-crystal cell substrate and is bonded onto a back side of the liquid-crystal display panel through an adhesive layer having a refractive index exhibiting a refractive index difference of not higher than 0.20 from the refractive index of the nearest liquid-crystal cell substrate, and a reflection layer disposed on a back side of the optical path changing sheet. The optical path changing sheet includes optical path changing slopes and flat surfaces. Each of the optical path changing slopes faces the illuminator at an inclination angle in a range of from 30 to 48 degrees with respect to a plane of the optical path changing sheet and being provided for reflecting incident light from the illuminator toward the visual side of the liquid-crystal display panel. Each of the flat surfaces is inclined at an inclination angle of not larger than 10 degrees with respect to the sheet plane, and a projected area of the flat surfaces on the sheet plane is not smaller than 10 times as large as a projected area of the optical path changing slopes.

16 Claims, 3 Drawing Sheets

REFLECTION-TRANSMISSION DOUBLE TYPE LIQUID-CRYSTAL DISPLAY DEVICE

BACKGROUND OF THE INVENTION

1. Field of the Invention

The present invention relates to a transmission-reflection double type liquid crystal display device which can be reduced in thickness and weight easily and which is excellent in display quality.

The present application is based on Japanese Patent Application No. Hei. 11-369712, which is incorporated herein by reference.

2. Description of the Related Art

A liquid-crystal display device in which a back-lighting system using a bottom-lighting type or side-lighting type light pipe is disposed on a back side (opposite to a visual side) of a transmission type liquid-crystal display panel through a half-transmission type reflector is heretofore known as a reflection-transmission double type liquid-crystal display device which can be viewed in a transmission mode by using a built-in illuminator in addition to a reflection mode by using external light. The half-transmission type reflector is disposed in order to enable viewing in a reflection mode. If there is no half-transmission type reflector, viewing in a reflection mode by using external light is so dark that the liquid-crystal display device substantially hardly functions as a reflection type liquid-crystal display device.

The background-art reflection-transmission double type liquid-crystal display device using a back-lighting system, however, has the following problem. That is, it is difficult to reduce the thickness, size and weight of the liquid-crystal display device though greater reduction in thickness, size and weight of the liquid-crystal display device has been demanded for the purpose of reducing in size and weight of a portable telephone set, a portable personal computer, or the like. Incidentally, in a bottom-lighting type back-lighting system, a thickness of not smaller than 4 mm is generally required for a light diffusing plate and a reflector which are disposed together with the illuminator. In a side-lighting type light pipe, a plate thickness of not smaller than 1 mm is required for light transmission. If a light diffusing plate, a reflector, a prism sheet, etc. are further disposed on the side-lighting type light pipe, a further thickness of not smaller than 3 mm is generally required. If at least one half-transmission type reflector is still further added, the volume and weight of the liquid-crystal display device become even larger. Moreover, there is a problem that viewing in a transmission mode becomes dark because of the arrangement of the half-transmission type reflector and that brightness in a reflection mode is inferior to that of a reflection exclusive type liquid-crystal display device using a high-reflectance reflection layer.

SUMMARY OF THE INVENTION

An object of the present invention is to develop a transmission-reflection double type liquid-crystal display device which can be reduced in thickness and weight easily and which is excellent in display quality.

According to the present invention, there is provided a reflection-transmission double type liquid-crystal display device comprising: a transmission type liquid-crystal display panel including a liquid-crystal cell; at least one illuminator disposed on at least one of side surfaces of the liquid-crystal display panel and capable of being switched on/off; an optical path changing sheet which has a refractive index exhibiting a refractive index difference of not higher than 0.15 from a refractive index of a nearest liquid-crystal cell substrate, and which is bonded onto a back side (opposite to a visual side) of the liquid-crystal display panel through an adhesive layer having a refractive index exhibiting a refractive index difference of not higher than 0.20 from the refractive index of the nearest liquid-crystal cell substrate; and a reflection layer disposed on a back side of the optical path changing sheet; the optical path changing sheet including optical path changing slopes and flat surfaces, each of the optical path changing slopes facing the illuminator at an inclination angle in a range of from 30 to 48 degrees with respect to a plane of the optical path changing sheet and being provided for reflecting incident light from the illuminator toward the visual side of the liquid-crystal display panel, each of the flat surfaces being inclined at an inclination angle of not larger than 10 degrees with respect to the sheet plane so that a projected area of the flat surfaces on the sheet plane is not smaller than 10 times as large as a projected area of the optical path changing slopes on the sheet plane.

According to the present invention, while incident light from an illuminator disposed on one of side surfaces of a liquid-crystal display panel is transmitted backward efficiently by use of liquid-crystal cell substrates, the optical path of the transmission light is changed efficiently toward the visual side of the liquid-crystal display panel through an optical path changing sheet disposed on the back side of the panel. Hence, the transmission light can be utilized for liquid-crystal display in a transmission mode. Moreover, external light can be transmitted/reflected efficiently through/by flat surfaces of the optical path changing sheet and a reflection layer. Hence, the external light can be utilized for liquid-crystal display in a reflection mode. The illuminator which is disposed on the side surface, the optical path changing sheet which is excellent in thickness, and the reflection layer can form a back-lighting (transmission mode) system and a reflection mode system. Hence, a transmission-reflection double type liquid-crystal display device which is excellent in thickness and light in weight, and which is bright and excellent in display quality can be formed.

The aforementioned effect is based mainly on use of a slope reflection type optical path changing sheet. That is, light incident on a side surface or transmission light of the incident light is reflected by slopes of the optical path changing sheet so that the optical path of the light can be changed with good directivity. Hence, good visibility in a transmission mode can be achieved. Moreover, external light is transmitted through flat surfaces of the optical path changing sheet so that the external light can be kept sufficiently. Hence, good visibility in a reflection mode can be also achieved. In a method of scatter reflection by a roughened surface, it is difficult to achieve the aforementioned effect. Incidentally, JP-A-5-158033 discloses a reflection type liquid-crystal display device in which illumination light is made incident on one of side surfaces of a liquid-crystal display panel and totally reflected by a visual side cell substrate and in which the reflected light is scattered by a rough surface type reflector so that the scattered light is utilized for display.

In the aforementioned case, however, light allowed to be utilized for display is light that comes out from the panel due to coming contrary against the total reflection condition by scattering. Generally, scattered light exhibits a normal distribution having a direction of regular reflection as a peak, in Extended Abstracts (20th Liquid-Crystal Discussion Lecture Vol. 3 G510, Tohoku University; Uchida et al). Hence, the aforementioned display light is light largely inclined with respect to a frontal (vertical) direction and therefore hardly utilized effectively for display. Hence, the display becomes dark in the frontal direction. Nevertheless, intensifying scattering by the roughened surface type reflector is unfavorable to display in a reflection mode because the quantity of light in the frontal direction in the reflection mode is reduced (SID 96 DIGEST pp.149–152). It is, therefore, necessary to adjust scattering intensity to keep balance between both transmission and reflection modes in such a roughened surface type scattering reflection method. It is, however, difficult to obtain scattering intensity favorable to the two reflection and transmission modes because scattering intensity required in the transmission mode is antinomic to scattering intensity required in the reflection mode.

On the other hand, the slope reflection type optical path changing sheet according to the present invention mainly utilizes light exhibiting a peak in a direction of regular reflection and controls the optical path of the reflected light. Hence, directivity, especially frontal directivity, favorable to display can be provided easily, and a bright transmission mode can be achieved. Also in a reflection mode, flat portions of the optical path changing sheet except the slopes can be utilized, and efficient entrance, reflection and transmission of external light can be ensured. Hence, the state of light can be balanced easily so as to be favorable to both transmission and reflection modes.

Features and advantages of the invention will become understood from the following detailed description of the preferred embodiments described in conjunction with the attached drawings.

DETAILED DESCRIPTION OF THE PREFERRED EMBODIMENTS

Figure 1:
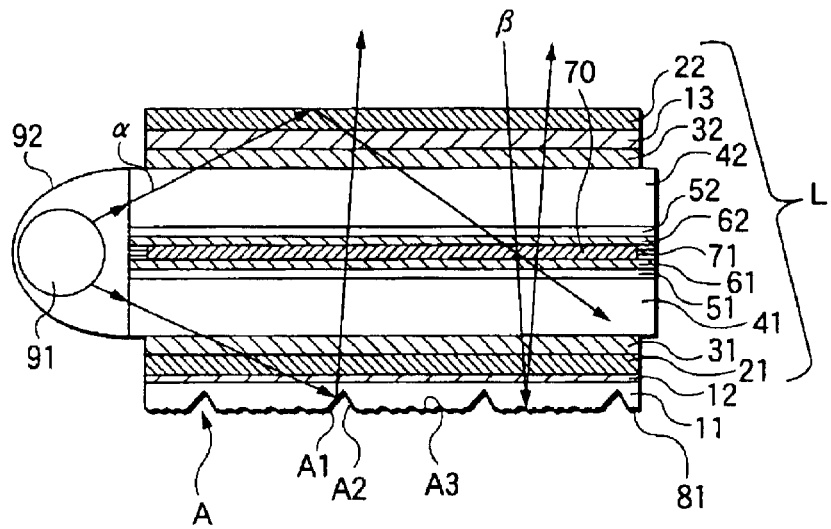
FIG. 1 is an explanatory sectional view showing an example of a reflection-transmission double type liquid-crystal display device.
Figure 2:
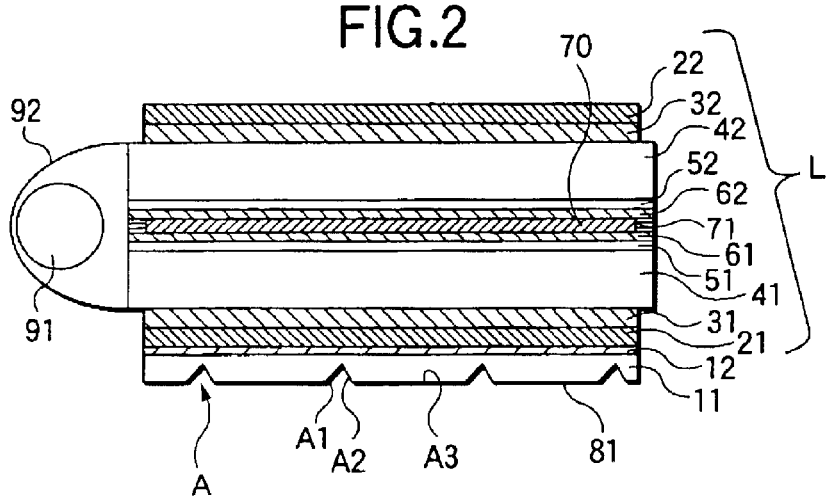
FIG. 2 is an explanatory sectional view showing another example of the reflection-transmission double type liquid-crystal display device.
Figure 3:
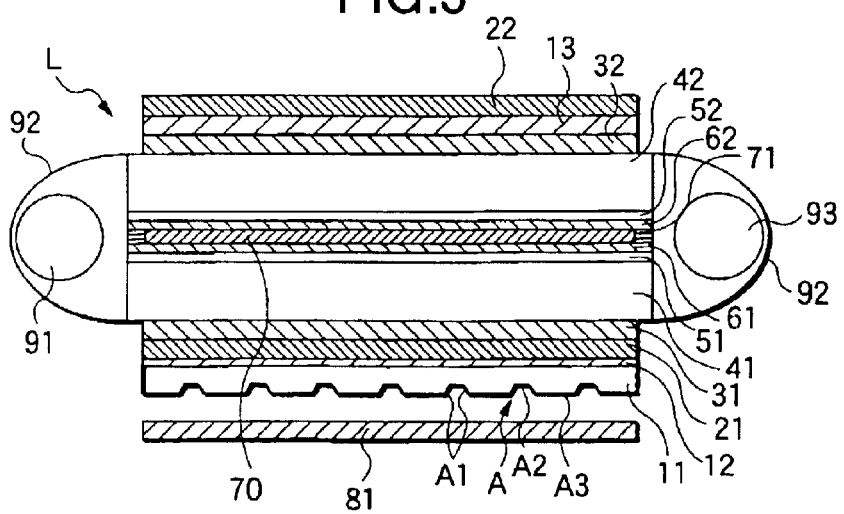
FIG. 3 is an explanatory sectional view showing a further example of the reflection-transmission double type liquid-crystal display device.

The reflection-transmission double type liquid-crystal display device according to the present invention comprises: a transmission type liquid-crystal display panel including a liquid-crystal cell; at least one illuminator disposed on at least one of side surfaces of the liquid-crystal display panel and capable of being switched on/off; an optical path changing sheet which has a refractive index exhibiting a refractive index difference of not higher than 0.15 from a refractive index of a nearest liquid-crystal cell substrate, and which is bonded onto a backside (opposite to a visual side) of the liquid-crystal display panel through an adhesive layer having a refractive index exhibiting a refractive index difference of not higher than 0.20 from the refractive index of the nearest liquid-crystal cell substrate; and a reflection layer disposed on a back side of the optical path changing sheet; the optical path changing sheet including optical path changing slopes and flat surfaces, each of the optical path changing slopes facing the illuminator at an inclination angle in a range of from 30 to 48 degrees with respect to a plane of the optical path changing sheet and being provided for reflecting incident light from the illuminator toward the visual side of the liquid-crystal display panel, each of the flat surfaces being inclined at an inclination angle of not larger than 10 degrees with respect to the sheet plane so that a projected area of the flat surfaces on the sheet plane is not smaller than 10 times as large as a projected area of the optical path changing slopes on the sheet plane. FIGS. 1 to 3 show examples of the liquid-crystal display device. In FIGS. 1 to 3, L designates a liquid-crystal display panel; 11, an optical path changing sheet; A1, an optical path changing slope; A2 and A3, flat surfaces; 81, a reflection layer; and 91 and 93, illuminators.

A suitable transmission type display panel at least having a liquid-crystal cell may be used as the liquid-crystal display panel L. That is, as shown in FIGS. 1 to 3, a display panel has at least a liquid-crystal cell. The liquid-crystal cell has liquid crystal 70 enclosed by cell substrates 41 and 42 through a sealing material 71. Thus, the light incident on a side of arrangement of the optical path changing sheet 11 is made to go out as display light from the other side of the arrangement through control by means of the liquid crystal. The liquid-crystal display panel L is not particularly limited in kind.

Incidentally, on the basis of the format of alignment of liquid crystal, specific examples of the liquid-crystal cell include a TN liquid-crystal cell, an STN liquid-crystal cell, a perpendicularly aligned cell, an HAN cell, a twisted or non-twisted cell such as an OCB cell, a guest-host liquid-crystal cell, a ferroelectric liquid-crystal cell, etc. Further, a suitable drive method such as an active matrix method or a passive matrix method may be used as the method for driving liquid crystal. As shown in FIGS. 1 to 3, the liquid crystal is generally driven through transparent electrodes 51 and 52 provided on the inner surfaces of the pair of cell substrates 41 and 42.

A suitable transparent substrate such as a glass substrate or a resin substrate can be used as each of the cell substrates. Especially, a substrate made of an optically isotropic material is preferably used from the point of view of display quality, etc. A substrate such as a non-alkali glass plate exhibiting excellent colorlessness and transparency with respect to a blue glass plate is preferably used from the point of view of improvement of luminance and display quality, etc. A resin substrate is preferably used from the point of view of reduction in weight, etc. The thickness of the cell substrate can be determined suitably in accordance with enclosing strength of liquid crystal, or the like, without any particular limitation. The thickness of the cell substrate is generally selected to be in a range of from 10 $\mu$m to 5 mm, particularly in a range of from 50 µm to 2 mm, more particularly in a range of from 100 µm to 1 mm, from the point of view of balance between light transmission efficiency and reduction in thickness and weight, etc.

When the liquid-crystal cell is formed, one suitable functional layer, or, two or more suitable functional layers may be provided as occasion demands. Examples of such a functional layer include an aligned film made of a rubbed film, etc., for aligning the liquid crystal, a color filter for color display, and so on. Incidentally, aligned films 61 and 62 are generally formed on transparent electrodes 51 and 52 as shown in FIGS. 1 to 3. A color filter not shown is generally provided between one of the cell substrates 41 and 42 and corresponding one of the transparent electrodes 51 and 52.

The liquid-crystal display panel may contain one suitable optical layer or two or more suitable optical layers such as polarizers 21 and 22, phase retarders 31 and 32, a light diffusing layer 13, etc. added to the liquid-crystal cell as shown in FIGS. 1 to 3. The polarizers are provided for achievement of display using linearly polarized light. The phase retarders are provided for improvement of display quality by compensation, etc., for retardation due to birefringence of liquid crystal. The light diffusing layer is provided for enlargement of a display range by diffusion of display light, uniformity of luminance by leveling of emission-line-like light emission through slopes of the optical path changing sheet, increase of the quantity of light incident on the optical path changing sheet due to diffusion of transmission light in the liquid-crystal display panel, etc.

A suitable material may be used as each of the polarizers without any particular limitation. From the point of view of obtaining good-contrast-ratio display due to incidence of highly linearly polarized light, etc., an absorption type polarizing film made of a drawn film having a dichromatic material such as iodine or dichromatic dye adsorbed on a hydrophilic macromolecular film such as a polyvinyl alcohol film, a partially formalized polyvinyl alcohol film or a partially saponified ethylene-vinyl acetate copolymer film may be preferably used. Or a film high in the degree of polarization such as the absorption type polarizing film having a transparent protective layer provided on one or each side of the absorption type polarizing film may be preferably used.

A material excellent in transparency, mechanical strength, thermal stability, moisture shielding characteristic, etc. is preferably used for the formation of the transparent protective layer. Examples of the material include: polymers such as acetate resin, polyester resin, polyether-sulfone resin, polycarbonate resin, polyamide resin, polyimide resin, polyolefin resin, acrylic resin, polyether resin, polyvinyl chloride resin, polystyrene resin, norbornene resin, and flurocarbon resin; heat-curable or ultraviolet-curable resins such as acrylic resin, urethane resin, acrylic urethane resin, epoxy resin, silicone resin, etc.; and so on. The transparent protective layer may be bonded as a film by a bonding method or may be applied as polymer liquid by a coating method.

The polarizers to be used, especially the visual side polarizer may be subjected to non-glare treatment or anti-reflection treatment for preventing viewing from being disturbed by surface reflection of external light. Non-glare treatment can be made by the formation of a surface as a fine irregular structure. In the non-glare treatment, various methods may be used for forming a surface as a fine prismatic structure. Examples of the methods include: a surface roughening method such as a sandblasting method, an embossing method, etc.; a method of mixing transparent particles such as silica particles; and so on. Anti-reflection treatment can be made by a method of forming a coherent vapor deposition film, or the like. Alternatively, non-glare treatment or anti-reflection treatment can be made by a method of bonding a film having a surface structure of fine prismatic structures or having an interference film, or the like. Incidentally, two polarizers may be provided on both sides of the liquid-crystal cell as shown in FIGS. 1 to 3 or one polarizer may be provided on one side of the liquid-crystal cell.

On the other hand, each of the phase retarders may be formed of a suitable material. Examples of the suitable material include a birefringence film obtained by drawing a film of a suitable polymer as illustrated in the description of the transparent protective layer by a suitable method such as monoaxial drawing or biaxial drawing, an aligned film of a suitable liquid-crystal polymer such as a nematic liquid-crystal polymer or a discotic liquid-crystal polymer, and an aligned layer of the aligned film supported by a transparent base material. A material having a refractive index controlled in a direction of thickness under the operation of heat shrinkage force of a heat-shrinkable film may be also used. The compensatory phase retarders 31 and 32 shown in FIGS. 1 to 3 are generally disposed between the visual side polarizer 21 and the liquid-crystal cell and/or between the back side polarizer 22 and the liquid-crystal cell as occasion demands. A suitable material may be used as each of the phase retarders in accordance with the wavelength range, etc. Each of the phase retarders may be formed of a laminate of two or more layers in order to control optical characteristic such as retardation, etc.

The light diffusing layer can be provided by a suitable method using a coating layer, a diffusing sheet, or the like, having a similar surface structure of fine prismatic structures to that of the non-glare layer. The light diffusing layer 13 shown in FIGS. 1 and 3 is formed of an adhesive layer containing transparent particles. The light diffusing layer 13 serves also as a layer for bonding the polarizer 22 and the phase retarder 32 to each other, so that reduction in thickness is achieved. A suitable tackiness agent may be used for the formation of the adhesive layer. The tackiness agent contains, as a base polymer, a suitable polymer such as a rubber polymer, an acrylic polymer, a vinyl-alkyl-ether polymer, a silicone polymer, a polyester polymer, a polyurethane polymer, a polyether polymer, a polyamide polymer, a styrene polymer, etc.

Especially, a tackiness agent excellent in transparency, weather resistance, heat resistance, etc. such as a tackiness agent containing, as abase polymer, a polymer mainly containing alkyl ether of acrylic acid or methacrylic acid is used preferably. As the transparent particles mixed with the adhesive layer, there can be used one or two members suitably selected from the group consisting of inorganic particles of silica, alumina, titania, zirconia, tin oxide, indium oxide, cadmium oxide, antimony oxide, or the like, each of which has a mean particle size in a range of from 0.5 to 20 µm and which may be electrically conductive, and organic particles of a crosslinked or non-crosslinked polymer, or the like.

The illuminators disposed on side surfaces of the liquid-crystal display panel are provided so that light to be utilized as light for illuminating the reflection-transmission double type liquid-crystal display device in a transmission (switched-on) mode is made incident on the side surfaces of the liquid-crystal display panel. Hence, reduction in thickness and weight of the liquid-crystal display device can be achieved when the illuminators are used in combination with the optical path changing sheet disposed on the back side of the panel. A suitable illuminator can be used as each of the illuminators. Examples of the illuminator preferably used include a linear light source such as a (cold or hot) cathode tube, a point light source such as a light-emitting diode, an array of point light sources arranged in line or plane, and a combination of a point light source and a linear light pipe for converting the incident light from the point light source into light of a linear light source through the linear light pipe.

One illuminator 91 may be disposed on one of side surfaces of the liquid-crystal display panel L as shown in FIGS. 1 and 2 or illuminators 91 and 93 may be disposed on two or more side surfaces of the liquid-crystal display panel L as shown in FIG. 3. When illuminators are disposed on a plurality of side surfaces, the plurality of side surfaces may be provided as a combination of side surfaces opposite to each other as shown in FIG. 3 or may be provided as a combination of side surfaces crossing each other. Further, the plurality of side surfaces may be provided as a combination of three or more side surfaces by use of the aforementioned combinations.

The illuminators make it possible to view the liquid-crystal display device in a transmission mode in which the illuminator is switched on. In the case where the liquid-crystal display device is provided as a transmission-reflection double type liquid-crystal display device, the illuminators can be switched on/off because they are unnecessary to be switched on when the liquid-crystal display device is viewed by external light in a reflection mode. A suitable method may be used for switching on/off the illuminators. Any one of background-art methods may be used. Incidentally, the illuminators may be of a multicolor light emission type in which the color of emitted light can be changed. Or different types of illuminators may be provided so that multicolor light emission can be made by the different types of illuminators.

As shown in FIGS. 1 to 3, each of the illuminators 91 and 93 may be used in combination with a suitable assisting means such as a reflector 92 or the like for enclosing the illuminator to lead scattered light to side surfaces of the liquid-crystal display panel L as occasion demands. A suitable reflection sheet such as a resin sheet provided with a high-reflectance metal thin film, a white sheet, a sheet of metal foil, etc. can be used as the reflector. The reflector may be used also as a fixing means for enclosing the illuminator by a method of bonding end portions of the reflector to end portions of the cell substrate of the liquid-crystal display panel, respectively.

The optical path changing sheet is disposed on the back side (opposite to the visual side) of the liquid-crystal display panel for the purposes as follows. That is, the optical path changing sheet changes the optical path of the incident light or transmission light α from the illuminator 91, which is disposed on one of side surfaces of the liquid-crystal display panel L as indicated by the arrow in FIG. 1, to the visual side of the panel L through the optical path changing slopes A1 to thereby utilize the light as illumination light (display light) in a transmission mode. Further, the optical path changing sheet makes the external light β incident on the visual side of the liquid-crystal display panel L in a switched-off state of the illuminator 91 and makes the incident light be transmitted and reflected by the flat surfaces A2 or A3 and the reflection layer 81 to thereby utilize the light as illumination light (display light) in a reflection mode. For those purposes, the optical path changing sheet 11 is provided with slopes A1 and flat surfaces A2 and A3 as shown in FIGS. 1 to 3. The slopes A1 reflect the incident light α from the illuminators 91 and 93 in a predetermined direction to thereby change the optical path of the light. The flat surfaces A2 and A3 transmit incident external light β.

The optical path changing sheet is provided for fulfilling the aforementioned reflection/transmission characteristic, especially for obtaining illumination light excellent in frontal directivity in both reflection and transmission modes. That is, the optical path changing sheet is formed as an optical path changing sheet having a plurality of optical path changing means A each constituted by an optical path changing slope A1 facing a side surface of arrangement of the illuminator, that is, facing an incidence side surface at an inclination angle in a range of from 30 to 48 degrees with respect to a sheet plane, and flat surfaces A2 and A3 inclined at an inclination angle of not larger than 10 degrees with respect to the sheet plane so that the projected area of the flat surfaces A2 and A3 on the sheet plane is not smaller than 10 times as large as the projected area of the optical path changing slope A1 on the sheet plane. Especially, from the point of view of reflection/transmission characteristic as described above, it is preferable that an optical path changing sheet has a plurality of optical path changing means A constituted by optical path changing slopes A1 and formed into prismatic structures.

Figure 4A:
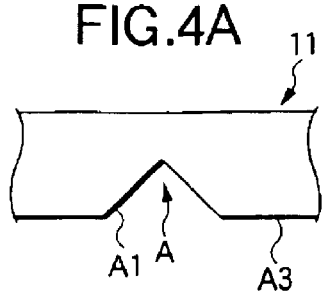
FIGS. 4A, 4B, 4C, 4D, 4E, 4F, and 4G are explanatory side views showing various optical path changing means in an optical path changing sheet.
Figure 4B:
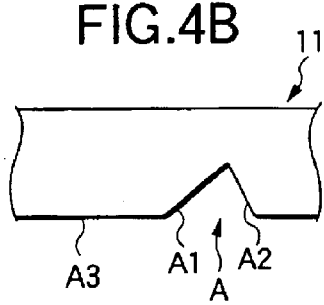
Figure 4C:
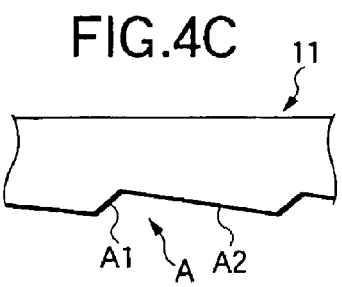
Figure 4D:
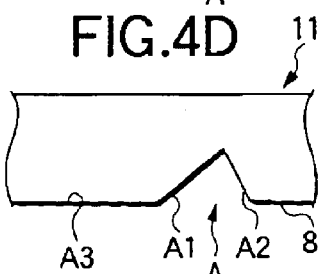
Figure 4E:
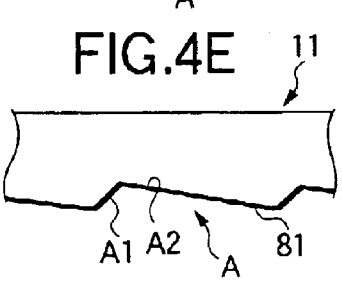
Figure 4F:
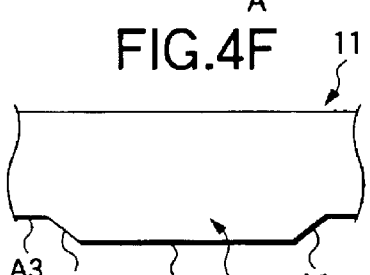
Figure 4G:
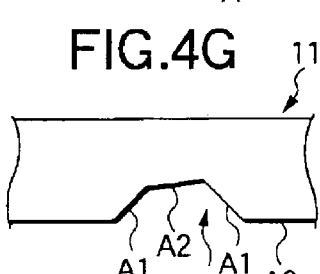

FIGS. 4A to 4G show examples of the optical path changing means A having an optical path changing slope and flat surfaces and being formed into prismatic structures as described above. In FIGS. 4A to 4E, each optical path changing means A is substantially shaped like a triangle in section. In FIGS. 4F and 4G, each optical path changing means A is substantially shaped like a rectangle in section. In FIG. 4A, each optical path changing means A has an isosceles triangle with two optical path changing slopes A1, and a flat surface A3. In FIG. 4B, each optical path changing means A has an optical path changing slope A1, a steep slope A2 having an inclination angle larger than that of the slope A1 with respect to the sheet plane, and a flat surfaces A3. In FIG. 4C, a plurality of optical path changing means A are provided as a repetitive structure in which the optical path changing means A are formed on the whole surface of the sheet plane so as to be continued and adjacent to one another, and each of the optical path changing means A has an optical path changing slope A1 and a flat surface A2 having an inclination angle smaller than that of the slope A1 with respect to the sheet plane. In FIGS. 4D and 4E, the reflection layer 81 is provided on the flat surfaces A3 shown in FIG. 4B or on the flat surfaces A2 shown in FIG. 4C. In FIG. 4F, each optical path changing means A is constituted by a convex portion (protrusion). In FIG. 4G, each optical path changing means A is constituted by a concave portion (groove).

Hence, each optical path changing means may be formed from a concave or convex portion constituted by equal-side surfaces or slopes having equal inclination angles as described above. Alternatively, each optical path changing means may be formed of a concave or convex portion constituted by a combination of an optical path changing slope and a steep slope or a flat surface or slopes different in inclination angle. The shape of each optical path changing means may be determined suitably in accordance with the number of incidence side surfaces and the position of each incidence side surface. From the point of view of improving mar-proofness to keep the slope function high, the optical path changing means constituted by a concave portion is superior to each optical path changing means constituted by a convex portion because the optical path changing means constituted by a concave portion is hardly damaged at its slopes.

From the point of view of changing the optical path with good frontal directivity in a transmission mode, each of the optical path changing slopes A1 is preferably provided so as to face a corresponding incidence side surface. Hence, when illuminators are disposed on two or more side surfaces of the liquid-crystal display panel and two or more incidence surfaces are therefore provided, an optical path changing sheet having optical path changing slopes A1 corresponding to the number and positions of the incidence side surfaces is used preferably. Incidentally, when illuminators 91 and 93 are disposed on two opposite side surfaces of the liquid-crystal display panel L as shown in FIG. 3, there is preferably used an optical path changing sheet 11 having optical path changing slopes A1 every two of which constitute an optical path changing means A substantially shaped like an isosceles triangle in section as shown in FIG. 4A, or an optical path changing sheet 11 having optical path changing slopes A1 every two of which constitute an optical path changing means A substantially shaped like a trapezoid in section as shown in FIGS. 4F and 4G so that the ridgelines formed by the optical changing slopes A1 are parallel to the incidence side surfaces respectively.

When illuminators are disposed on two adjacent cross side surfaces of the liquid-crystal display panel, there is preferably used an optical path changing sheet 11 having optical path changing slopes A1 corresponding to the side surfaces respectively so that the ridgelines formed by the optical path changing slopes A1 are parallel to the two cross side surfaces respectively. When illuminators are disposed on three or more side surfaces inclusive of opposite side surfaces and adjacent cross side surfaces, there is preferably used an optical path changing sheet 11 having optical path changing slopes A1 constituted by a combination of the aforementioned slopes.

The aforementioned optical path changing slopes A1 have a role of reflecting the light incident on the slopes A1 among the light incident on the incidence side surface from the illuminator or the transmission light from the illuminator to thereby change the optical path of the light and supply the light to the visual side of the liquid-crystal display panel. In this case, when the inclination angle of each of the optical path changing slopes A1 with respect to the sheet plane is selected to be in a range of from 30 to 48 degrees, the optical path of the light incident on the side surface or the transmission light α from the illuminator 91 can be changed with good frontal directivity as indicated by the arrow of polygonal-line in FIG. 1 as to be sufficiently perpendicular to the sheet plane so that illumination light excellent in frontal directivity can be obtained efficiently. If the inclination angle is smaller than 30 degrees, the optical path of the reflected light is generally largely shifted by 30 degrees or more from the frontal direction. Accordingly, frontal luminance in a transmission mode becomes poor because the reflected light is difficult to be utilized for display effectively. If the inclination angle is larger than 48 degrees, the condition for total reflection of the light incident on the side surface or the transmission light cannot be satisfied. Accordingly, efficiency of utilization of the light incident on the side surface may run short because the light leaking from the optical path changing slopes increases.

From the point of view of optical path change excellent in frontal directivity, suppression of leaking light, etc., and in consideration of the condition for total reflection of light transmitted in the liquid-crystal display panel on the basis of refraction in accordance with Snell's law, the inclination angle of each of the optical path changing slopes A1 is preferably in a range of from 35 to 46 degrees, more preferably in a range of from 38 to 45 degrees, further preferably in a range of from 40 to 44 degrees. Incidentally, the condition for total reflection by a glass plate is generally 42 degrees. In this case, light incident on the side surface is made incident on the optical path changing slopes while transmitted in a condition that the incident light is condensed in a range of ±42 degrees.

On the other hand, in the optical path changing sheet 11 functioning as a portion of incidence of external light and as a portion of transmission of the incident light reflected by the reflection layer 81 to enable display in a reflection mode by using external light in a switched-off state of the illuminator, the inclination angle of each of flat surfaces A2, A3, etc. is preferably selected to be not larger than 10 degrees with respect to the sheet plane from the point of view of reflecting incident external light in the frontal direction as much as possible. The preferable flat surfaces from the point of view of frontal directivity of the reflected light are flat surfaces A2 inclined at an inclination angle of not larger than 8 degrees, especially not larger than 5 degrees, more especially not larger than 3 degrees; or flat surfaces A3 inclined at an inclination angle of about 0 degrees.

In the aforementioned case, especially when the optical path changing means A are formed as a repetitive structure in which the optical path changing means A are continued and adjacent to one another and each of the optical path changing means A has an optical path changing slope A1 and a flat surface A2 as shown in FIGS. 4C and 4E, the angle difference between inclination angles of the flat surfaces A2 with respect to the sheet plane on the whole of the optical path changing sheet is selected, preferably, to be not larger than 5 degrees, more preferably not larger than 4 degrees, further preferably not larger than 3 degrees, and the difference between inclination angles of adjacent flat surfaces A2 is selected preferably to be not larger than 1 degree, more preferably not larger than 0.3 degrees, further preferably not larger than 0.1 degrees. This arrangement is for the purpose of preventing the optimum viewing direction of the liquid-crystal display device in a reflection mode, especially the optimum viewing direction in a direction near the frontal direction, from changing largely due to reflection by the flat surfaces A2, particularly from changing largely in between adjacent flat surfaces.

To achieve bright display in a reflection mode on the basis of improvement in efficiency of incidence of external light and in efficiency of transmission of the light reflected by the reflection layer, the flat surfaces are formed so that the projected area of the flat surfaces on the sheet plane is selected to be not smaller than 10 times, particularly not smaller than 12 times, more particularly not smaller than 15 times as large as the projected area of the optical path changing slopes A1 on the sheet plane. Hence, in the case of a plurality of optical path changing means A each containing a steep slope A2 not functioning as the aforementioned flat surface as illustrated in FIGS. 4B and 4D, it is preferable that the angle of each of the steep slopes A2 is selected to be not smaller than 35 degrees, particularly not smaller than 50 degrees, more particularly not smaller than 60 degrees so that the width of each of the flat surfaces A3 can be widened. The flat surfaces each having the aforementioned inclination angle are favorable in terms of reflecting backward the light incident on the incidence side surface and transmitting efficiently the reflected light toward the opposite surface side to thereby emit light as uniformly as possible on the whole surface of the liquid-crystal display in a transmission mode.

Figure 5:
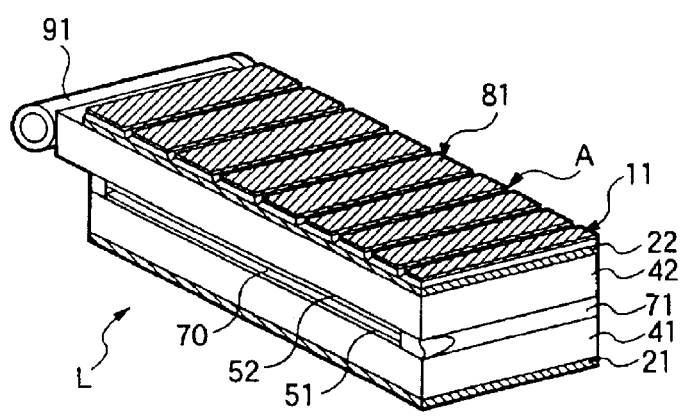
FIG. 5 is an explanatory perspective view showing a further example of the reflection-transmission double type liquid-crystal display device.
Figure 6:
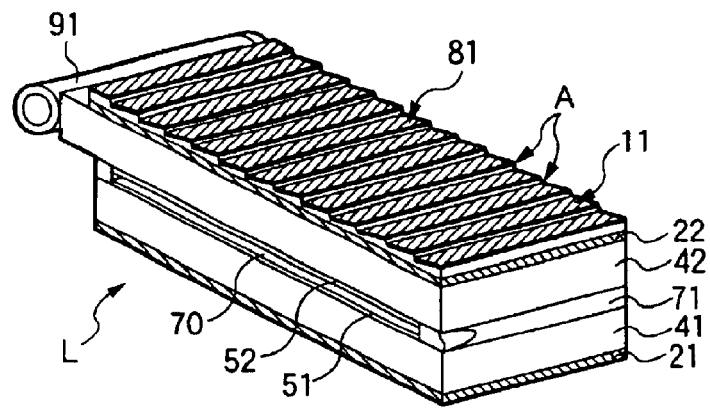
FIG. 6 is an explanatory perspective view showing a further example of the reflection-transmission double type liquid-crystal display device.
Figure 7:
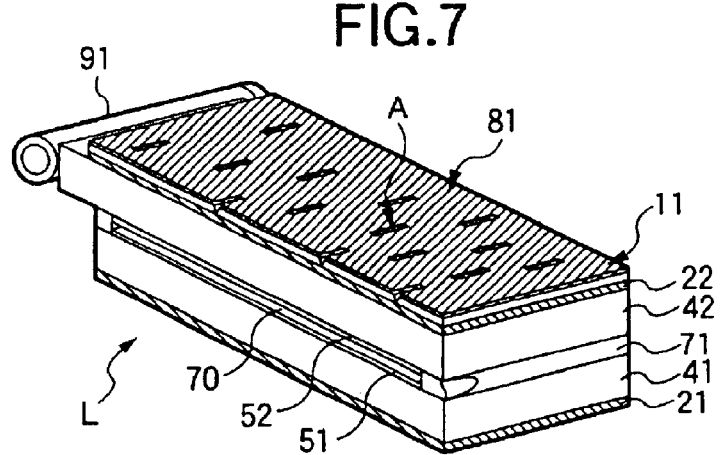
FIG. 7 is an explanatory perspective view showing a further example of the reflection-transmission double type liquid-crystal display device.

As illustrated in FIGS. 5, 6 and 7, the optical path changing means A having optical path changing slopes and flat surfaces are generally formed as a repetitive structure for the purpose of reducing the thickness of the optical path changing sheet so that the ridgelines of the optical path changing means A are parallel to or inclined to the incidence side surface of the liquid-crystal display panel L on which the illuminator 91 is disposed. In this case, the optical path changing means A may be formed so as to be continued from one end to the other end of the optical path changing sheet as shown in FIGS. 5 and 6 or may be formed intermittently and discontinuously as shown in FIG. 7. When the optical path changing means A are formed discontinuously, it is preferable, from the point of view of efficiency of incidence of transmission light, efficiency of changing the optical path, etc., that the length of each prismatic structure made of a groove or a protrusion in a direction of the incidence side surface is selected to be not smaller than 5 times as large as the depth or height thereof. Further, from the point of view of uniform light emission on the display screen of the panel, the length is selected preferably to be not larger than 500 µm, more preferably in a range of from 10 to 480 µm, further preferably in a range of from 50 to 450 µm.

The sectional shape of the plurality of optical path changing means A and the repetition pitch of the optical path changing slopes A1 defined by the sectional shape of the means A are not particularly limited. They can be determined suitably in accordance with the uniformity of light emission on the display screen of the panel, etc., both in a transmission mode and in a reflection mode which uses external light because the optical path changing slopes A1 are factors for determining luminance in a transmission (switched-on) mode. Hence, the quantity of light which optical path is changed can be controlled on the basis of the distribution density of the optical path changing means A.

Figure 8:
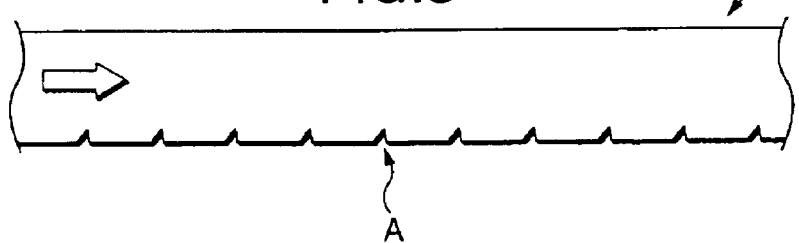
FIG. 8 is an explanatory side view showing an example of the optical path changing sheet.
Figure 9:
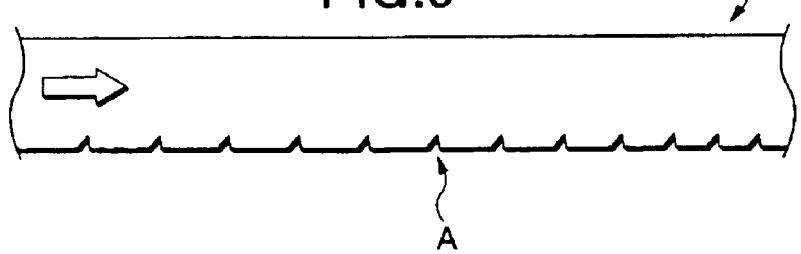
FIG. 9 is an explanatory side view showing another example of the optical path changing sheet.

Therefore, the inclination angles, the shapes, or the like, of the slopes A1 or A2 may be equal on the whole surface of the sheet or may be changed so that the inclination angle, the shape, or the like, of the optical path changing means A is enlarged as the optical path changing means goes farther from the incidence side surface, as shown in FIG. 8, for the purpose of coping with absorption loss and attenuation of transmission light due to the optical path changing and therefore making light emission on the display screen of the panel uniform. The plurality of optical path changing means A may be disposed at regular intervals of a predetermined pitch as shown in FIG. 8. Alternatively, as shown in FIG. 9, the plurality of optical path changing means A may be disposed at irregular intervals so that the pitch is narrowed as the optical path changing means A goes farther from the incidence side surface to thereby make the distribution density of the optical path changing means A high. Alternatively, the pitch may be provided as a random pitch so that light emission on the display screen of the panel can be made uniform. In FIGS. 8 and 9, the arrow shows the direction of transmission of light incident on the incidence side surface.

In a reflection mode, unnatural display may be caused by shortage of transmission of display light if the optical path changing slopes A1 overlap pixels of the liquid-crystal cell. It is preferable from the point of view of preventing the unnatural display, etc., that the overlap area is reduced as much as possible to thereby keep sufficient light transmittance through the flat surfaces A2 or A3. From this point of view and in consideration that the pixel pitch of the liquid-crystal cell is generally in a range of from 100 to 300 µm, each of the optical path changing slopes A1 is selected preferably to be not larger than 40 µm, more preferably in a range of from 3 to 20 µm, further preferably in a range of from 5 to 15 µm in terms of the projected width thereof on the sheet plane. The aforementioned projected width is also preferable from the point of view of preventing display quality from being lowered because of diffraction in consideration that the coherent length of a fluorescent tube is generally set to about 20 µm.

It is preferable from the aforementioned point of view that the distance between adjacent ones of the optical path changing slopes A1 is large. As described above, however, the optical path changing slopes A1 also serve as a functional portion for substantially generating illumination light by changing the optical path of light incident on the side surface in a transmission mode. Hence, if the distance is too large, illumination in a switched-on mode becomes so sparse that display may be unnatural. In consideration of these facts, the repetition pitch of the optical path changing slopes A1 is selected preferably to be not larger than 5 mm, more preferably in a range of from 20 µm to 3 mm, further preferably in a range of from 50 µm to 2 mm.

When the optical path changing means are constituted by a repetitive prismatic structures, moire may occur because of interference between the optical path changing means and the pixels of the liquid-crystal cell. Although prevention of moire can be made by adjustment of the pitch of the prismatic structures in the repetitive structure, the pitch of the prismatic structures in the repetitive structure is limited to the aforementioned preferable range. Hence, measures against the case where moire occurs even the pitch is in the aforementioned range become the problem to be solved. In the present invention, it is preferable to use a method in which the ridgelines of the prismatic structures are formed to be inclined with respect to the incidence side surface so that the prismatic structures in the repetitive structure can be arranged to cross the pixels to thereby prevent moire. On this occasion, if the inclination angle to the incidence side surface is too large, deflection occurs in reflection by the optical path changing slopes A1. As a result, large deviation occurs in the direction of changing the optical path. This large deviation is apt to cause lowering of display quality. Therefore, the inclination angle of the ridgelines with respect to the incidence side surface is selected preferably to be in a range of ±30 degrees, more preferably in a range of ±25 degrees. Incidentally, the symbol "±" means the direction of inclination of the ridgelines with the incidence side surface as a reference. If the resolution of the liquid-crystal cell is so low that moire never occurs or if moire is negligible, it is preferable that the ridgelines are arranged to be as parallel with the incidence side surface as possible.

The optical path changing sheet may be formed from a suitable material exhibiting transparency in accordance with the wavelength range of the illuminator. Incidentally, examples of the material used in a visible light range include polymers or curable resins as illustrated in the description of the transparent protective layer, glass, or the like. An optical path changing sheet made from a material exhibiting no birefringence or little birefringence is used preferably. From the point of view of suppressing the loss of the quantity of the light which is enclosed by the panel because of interface reflection so as not to be allowed to exit from the panel; and therefore efficiently supplying the light, which is the incident on the side surface or the transmission light of the incident light, to the optical path changing sheet, especially to the optical path changing slopes A1; the optical path changing sheet is preferably formed from a material in which the refractive index difference between the optical path changing sheet and the nearest liquid-crystal cell substrate is not larger than 0.15, especially not larger than 0.10, more especially not larger than 0.05 so that interface reflection is suppressed.

The optical path changing sheet can be formed by a suitable method such as a cutting method. Examples of the production A method preferable from the point of view of mass production include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, by ultraviolet rays or by radial rays is polymerized in the condition that the fluid resin is cast in a mold capable of forming a predetermined shape, or in the condition that a mold capable of forming a predetermined shape is filled with the fluid resin; and so on. The thickness of the optical path changing sheet can be determined suitably. From the point of view of reduction in thickness, etc., generally, the thickness of the optical path changing sheet is selected preferably to be not larger than 300 $\mu$m, more preferably in a range of from 5 to 200 $\mu$m, further preferably in a range of from 10 to 100 $\mu$m. Incidentally, the optical path changing sheet may be also formed by a method of adding a plurality of optical path changing means made of the same kind of material or different kinds of materials to a resin sheet.

From the point of view of improvement in efficiency of transmission light supply to the optical path changing slopes A1 by suppression of interface reflection, improvement in efficiency of incidence of external light on the optical path changing sheet, improvement in luminance by effective utilization of the light incident on the side surface and external light, etc., it is preferable that the optical path changing sheet is bonded onto the back side (opposite to the visual side) of the liquid-crystal display panel L as shown in FIGS. 1 to 3 through an adhesive layer 12 in which the refractive index difference between the adhesive layer and the nearest liquid-crystal cell substrate is not larger than 0.2, particularly not larger than 0.1, more particularly not larger than 0.05. On this occasion, as shown in FIGS. 1 to 3, it is preferable, from the point of view of efficiency of utilization of transmission light and external light, etc., that the optical path changing sheet is disposed so that the surface on which a plurality of optical path changing means A are formed is located on the outer surface (on the back side which is opposite to the visual side). The adhesive layer 12 may be of a light diffusion type similarly to the adhesive layer 13 on the visual side.

As shown in FIGS. 1 to 3, a reflection layer 81 may be disposed on the outer surface, that is, on the backside (opposite to the visual side) of the optical path changing sheet 11. As described above, the reflection layer is provided for enabling viewing in a reflection mode of the liquid-crystal display device. The reflection layer is also effective in improving light utilizing efficiency in a transmission mode by reflecting and inverting the light leaking from the optical path changing sheet to thereby make the light incident on the optical path changing sheet again. The reflection layer may be merely put on the outer surface of the optical path changing sheet 11 as shown in FIG. 3 or may be bonded to the optical path changing sheet 11 by an adhering method, a vapor deposition method, or the like, as shown in FIGS. 1 and 2. When the reflection layer 81 is bonded to the optical-path-changing-means-forming surface of the optical path changing sheet 11 as shown in FIGS. 1 and 2, the reflecting effect can be improved to thereby prevent light leakage approximately perfectly and improve viewing angle characteristic and luminance more greatly.

Therefore, the reflection layer can be formed of a suitable material such as a white sheet, etc., in accordance with the background art. Especially, as a preferable example, a high-reflectance reflection layer is constituted by: a coating layer containing powder of a high-reflectance metal such as aluminum, silver, gold, copper or chromium in a binder resin, or alloy powder of such a high-reflectance metal; a layer of the above-mentioned metal or a dielectric multilayer film deposited by a suitable thin-film forming method such as a vacuum vapor deposition method, a sputtering method, or the like; a reflection sheet having the coating layer or the deposited layer supported by a base material made of a film, or the like; a sheet of metal foil; and so on.

In the present invention, from the point of view of improvement of visibility both in a reflection mode and in a transmission mode, especially improvement of visibility in a reflection mode by improving frontal directivity of light, it is preferable that the light reflected by the reflection layer is diffused and made incident on the liquid-crystal cell. Such diffusion of the reflected light can be performed by a method as follows. That is, examples of the method include: a method of providing a light diffusion type adhesive layer for bonding the optical path changing sheet to the liquid-crystal display panel; a method of providing a light diffusion type optical path changing sheet or a light diffusion type reflection layer, and a method using these methods in combination. Specifically, an optical path changing sheet having a reflection layer made of a high-reflectance metal thin film may be bonded onto the optical path changing slope-forming surface through a light diffusion type adhesive layer. Alternatively, a reflection layer made of a high-reflectance metal thin film maybe provided on the optical-path-changing-slope-forming surface in an optical path changing sheet or a light diffusion type optical path changing sheet having the optical path changing slope-forming surface roughened. Alternatively, a light diffusion type reflection layer 81 may be provided as shown in FIG. 1.

The light diffusion type reflection layer may be formed by a suitable method. Examples of the suitable method include: a method of providing a reflection layer on a film base material having a surface structure of fine prismatic structures by a suitable method using a surface roughening method using sandblasting, matting, or the like, or by a particle adding method so that the fine prismatic structure of the film base material is reflected in the reflection layer; and a method of providing a light diffusing layer containing air bubbles or particles on the optical-path-changing-sheet-side surface of the reflection layer; and so on.

The reflection layer having such a fine prismatic structure in which the fine prismatic surface structure of the film base material is reflected may be formed by a suitable method of providing a metal on the surface of the film base material. Examples of the suitable method include: a vapor deposition method such as a vacuum vapor deposition method, an ion-plating method or a sputtering method; a plating method; and so on. In this case, an optical path changing sheet as described above may be used also as the film base material. From the point of view of obtaining good visibility both in a reflection mode and in a transmission mode on the basis of suppression of scattering in a transmission mode, the average inclination angle of the reflection layer in the fine prismatic structure is selected preferably to be not larger than 15 degrees, more preferably in a range of from 4 to 12 degrees, further preferably in a range of from 5 to 10 degrees. Incidentally, in the case of a light diffusion type reflection layer with a fine prismatic structure, there is also an advantage in that the occurrence of Newton rings due to adhesion can be prevented and visibility can be therefore improved.

In the liquid-crystal display device according to the present invention, a great part of the light incident on the incident side surface is transmitted backward through reflection in accordance with the law of refraction through the upper and lower cell substrates on the basis of thickness proportion of respective layers in the liquid-crystal display panel. While the light emit (leakage) from the surface of the panel is prevented and while total reflection at the interface between the optical path changing sheet 11 having the adjusted refractive index and the adhesive layer 12 is suppressed, the optical path of the light incident on the optical path changing slopes A1 of the optical path changing sheet is efficiently changed to the viewing direction, that is, to the frontal direction. The other part of the light is transmitted backward by total reflection and made incident on the optical path changing slopes A1 in the rear surface. The optical path of the other part of the light is efficiently changed to the viewing direction. Hence, display excellent in uniformity of brightness on the whole surface of the panel display screen can be achieved in a transmission mode. Moreover, display excellent in uniformity of brightness on the whole surface of the panel display screen can be achieved in a reflection mode similarly to the background-art reflection exclusive type liquid-crystal display device. Hence, a reflection-transmission double type liquid-crystal display device which is bright, easy to view and excellent in display quality can be formed because the light from the illuminator and external light can be utilized efficiently.

Incidentally, in the present invention, optical devices or parts such as an optical path changing sheet, a liquid-crystal cell, a polarizer, a phase retarder, etc. for forming the liquid-crystal display device may be wholly or partially integrally laminated/fixed onto one another or may be disposed separately. From the point of view of prevention of lowering of contrast by suppressing the interface reflection, etc., it is preferable that such optical devices or parts are fixed onto one another. A suitable transparent adhesive agent such as a tackiness agent can be used for the close fixing process. The transparent adhesive layer may contain the transparent particles as described above so that the transparent adhesive layer can exhibit a diffusing function. The optical devices or parts, especially the visual side of the optical devices or parts may be formed to have ultraviolet-ray absorbing power by a method of treatment with an ultraviolet-ray absorbent such as a salicylic ester compound, a benzophenone compound, a benzotriazole compound, a cyanoacrylate compound, a nickel complex salt compound, etc.

EXAMPLE 1

An acrylic ultraviolet-curable resin (ARONIX LTV-3701 made by TOAGOUSEI Co., Ltd.) was dropped by a dropper so that a mold which was processed into a predetermined shape in advance was filled with the acrylic ultraviolet-curable resin. A triacetylcellulose (TAC) film (having a saponified surface) 80 $\mu$m thick was quietly set on the acrylic ultraviolet-curable resin and then bonded to the acrylic ultraviolet-curable resin by a rubber roller so that a surplus of the resin and air bubbles were removed. Then, the acrylic ultraviolet-curable resin was irradiated with ultraviolet rays by a metal halide lamp so that the resin was hardened. Then, the resin was released from the mold and cut into a predetermined size. Thus, an optical path changing sheet was obtained to have an optical path changing means layer with a refractive index of 1.533 formed on the TCA film with a refractive index of 1.485. An adhesive layer having a refractive index of 1.47 was bonded onto a surface of the optical path changing sheet in which no optical path changing means was provided.

The optical path changing sheet was 40 mm wide and 30 mm deep. The optical path changing sheet had prism-like concave portions which were disposed continuously at intervals of a pitch of 210 $\mu$m and which formed ridgelines inclined at an angle of 23 degrees with respect to the widthwise direction (FIG. 4C). Each of the prism-like concave portions had an optical path changing slope A1, and a flat surface A2. The inclination angle of each of the optical path changing slopes A1 varied in a range of from 42.5 to 43 degrees. The inclination angle of each of the flat surfaces A2 varied in a range of from 1.8 to 3.5 degrees. The difference between the inclination angles of adjacent ones of the flat surfaces A2 was not larger than 0.1 degrees. The projected width of each of the optical path changing slopes A1 on the sheet plane was in a range of from 10 to 16 $\mu$m. The ratio of the projected area of the flat surfaces A2 on the sheet plane to the projected area of the optical path changing slopes A1 on the sheet plane was not smaller than 12.

Then, a cold-cathode tube was disposed on one of side surfaces of a normally white transmission type TN liquid-crystal display panel which was already available on the market. The cold-cathode tube was enclosed by a reflector made of a silver-vapor-deposited reflection sheet. Opposite end portions of the reflector were bonded to upper and lower surfaces of the panel so that the cold-cathode tube was fixed. Then, a light diffusing film including a TAC film and a resin-fine-particle-containing adhesive layer provided on the TAC film was bonded to a polarizer on the back side (opposite to the visual side) of the liquid-crystal display panel. The aforementioned optical path changing sheet was bonded onto the light diffusing film so that the optical path changing slopes faced the cold-cathode tube. The panel was disposed on a light diffusion type reflection sheet made of a silver-vapor-deposited film having a surface structure of fine prismatic structures so that the optical path changing sheet was positioned on the back side which was opposite to the visual side of the panel. Thus, a reflection-transmission double type liquid-crystal display device was obtained. Incidentally, the refractive index of the cell substrate near the optical path changing sheet in the liquid-crystal display panel was 1.485.

EXAMPLE 2

A reflection-transmission double type liquid-crystal display device was obtained in the same manner as that in Example 1 except that the optical path changing sheet was replaced by an optical path changing sheet having a plurality of optical path changing means (FIG. 4B) each of which had an optical path changing slope A1 inclined at an inclination angle of about 42 degrees, a steep slope A2 making a vertical angle of 70 degrees with respect to the optical path changing slope A1, and a flat portion A3 having an area of not smaller than 10 times as large as the total projected area of the optical path changing slope A1 and the steep slope A2 on the sheet plane.

EXAMPLE 3

A reflection-transmission double type liquid-crystal display device was obtained in the same manner as that in Example 1 except that the optical path changing sheet was replaced by an optical path changing sheet (FIGS. 7 and 9). The sheet had a plurality of optical path changing means (FIG. 4B) each of which had a length of 80 $\mu$m, and each of which had an optical path changing slope A1 inclined at an inclination angle of about 42 degrees with a projected width of 10 μm on the sheet plane, and a steep slope A2 inclined at an inclination angle of about 55 degrees. In the sheet, the longitudinal direction of each optical path changing means was parallel to the incidence side surface, and the plurality of optical path changing means were disposed gradually with a higher density as the optical path changing means went farther from the incidence side surface in the depthwise direction. Incidentally, the area of the flat portions A3 was not smaller than 10 times as large as the total projected area of the optical path changing slopes A1 and the steep surfaces A2 on the sheet plane.

EXAMPLE 4

A reflection-transmission double type liquid-crystal display device was obtained in the same manner as that in Example 1 except that the optical path changing sheet was replaced by an optical path changing sheet (FIG. 7). The sheet had a plurality of optical path changing means (FIG. 4A) each having a length of 80 μm, and each having an isosceles triangle with two optical path changing slopes A1 which were inclined at an inclination angle of about 42 degrees and each of which had a projected width of 10 μm on the sheet plane. In the sheet, the longitudinal direction of each optical path changing means was parallel to the Incidence side surface and the plurality of optical path changing means were disposed at random so that the optical path changing means were gradually dense as the optical path changing means went farther from the incidence side surface toward the center portion in the depth wise direction and so that cold-cathode tubes were disposed on two opposite side surfaces of the optical path changing sheet. Incidentally, the area of the flat portions A3 was not smaller than 10 times as large as the total projected area of the optical path changing slopes A1 on the sheet plane.

EXAMPLE 5

A surface of a mold portion for forming flat portions A2 of an optical path changing sheet was roughened by sandblasting while the other portion was masked. A silver-vapor-deposited film was directly provided on the roughened surface portion to thereby form a reflection layer. Thus, an optical path changing sheet (FIG. 4E) was obtained. A reflection-transmission double type liquid-crystal display device was obtained in the same manner as that in Example 1 except that the optical path changing sheet was used while the light diffusion type reflection sheet was omitted.

EXAMPLE 6

A surface of a mold portion for forming flat portions A3 of an optical path changing sheet was roughened by sandblasting while the other portion was masked. A silver-vapor-deposited film was directly provided on the roughened surface portion to thereby form a reflection layer. Thus, an optical path changing sheet (FIG. 4D) was obtained. A reflection-transmission double type liquid-crystal display device was obtained in the same manner as that in Example 2 except that the optical path changing sheet was used while the light diffusion type reflection sheet was omitted.

EXAMPLE 7

A reflection-transmission double type liquid-crystal display device was obtained in the same manner as that in Example 2 except that styrene fine particles with a refractive index of 1.59 were mixed with the adhesive layer to form a light diffusion type adhesive layer and except that the light diffusion type reflection sheet was replaced by a reflection layer prepared by directly providing a silver-vapor-deposited film on a surface of the optical path changing sheet on which the optical path changing means were formed.

COMPARATIVE EXAMPLE 1

A reflection-transmission double type liquid-crystal display device was obtained in the same manner as that in Example 1 except that the optical path changing sheet was replaced by a scattering sheet subjected to sandblasting. Incidentally, the scattering sheet was disposed so that the roughened surface was positioned on the back side (opposite to the visual side).

COMPARATIVE EXAMPLE 2

A reflection-transmission double type liquid-crystal display device was obtained in the same manner as that in Example 1 except that the optical path changing sheet was replaced by an optical path changing sheet having a plurality of optical path changing means (FIG. 4B) each of which had an optical path changing slope A1 inclined at an inclination angle of about 25 degrees, a steep slope A2 making a vertical angle of 70 degrees with respect to the optical path changing slope A1, and a flat portion A3 having an area of not smaller than 10 times as large as the total projected area of the optical path changing slope A1 and the steep slope A2 on the sheet plane.

COMPARATIVE EXAMPLE 3

A reflection-transmission double type liquid-crystal display device was obtained in the same manner as that in Example 1 except that the optical path changing sheet was replaced by an optical path changing sheet having a plurality of optical path changing means (FIG. 4B) which were disposed at intervals of a pitch of 10 μm, and each of which had an optical path changing slope A1 inclined at an inclination angle of about 42 degrees with a projected width of from 18 to 27 μm on the sheet plane, a steep slope A2 making a vertical angle of 70 degrees with respect to the optical path changing slope A1, and a flat portion A3 having an area of not larger than 5 times as large as the total projected area of the optical path changing slope A1 and the steep surface A2 on the sheet plane.

COMPARATIVE EXAMPLE 4

A reflection-transmission double type liquid-crystal display device was obtained in the same manner as that in Comparative Example 1 except that the light diffusion type reflection sheet was replaced by a reflection layer prepared by directly providing a silver-vapor-deposited film on the back side of a scattering sheet.

COMPARATIVE EXAMPLE 5

A cold-cathode tube was disposed on one of side surfaces of a 1.2 mm-thick light pipe having an embossed rough surface on the back side (opposite to the visual side). The cold-cathode tube was enclosed by a reflector made of a silver-vapor-deposited reflection sheet. Opposite end portions of the reflector were bonded to upper and lower surfaces of the light pipe. The light pipe was disposed on a light diffusion type reflection sheet made of a silver-vapor-deposited film having a surface structure of fine prismatic structures. A normally white reflection-transmission double type TN liquid-crystal display panel which was already available on the market was disposed on the light pipe through a light diffusing plate. Thus, a reflection-transmission double type liquid-crystal display device was obtained.

Evaluation Test

Frontal luminance in the center portion of the reflection-transmission double type liquid-crystal display device obtained in each of Examples and Comparative Examples was measured in a transmission mode by a luminance meter (BM-7 made by TOPCON Corp.) while the cold-cathode tube was switched on in the condition that the liquid-crystal cell was supplied with no voltage. Further, frontal luminance was also measured in a reflection mode in the case where illumination was made by a ring-like illuminator so that external light was incident at an angle of 30 degrees while the cold-cathode tube was switched off in the same condition as described above. Results of the measurement were shown in the following Table.

|  | Frontal Luminance ($cd/m^2$) | |
| --- | --- | --- |
|  | Reflection Mode | Transmission Mode |
| Example 1 | 409 | 22 |
| Example 2 | 432 | 23 |
| Example 3 | 462 | 21 |
| Example 4 | 382 | 38 |
| Example 5 | 467 | 25 |
| Example 6 | 512 | 24 |
| Example 7 | 457 | 26 |
| Comparative Example 1 | 448 | 4 |
| Comparative Example 2 | 422 | 9 |
| Comparative Example 3 | 330 | 29 |
| Comparative Example 4 | 531 | 3 |
| Comparative Example 5 | 381 | 33 |

It is apparent from the Table that excellent frontal luminance was achieved in a transmission mode in Examples 1 to 7 compared with Comparative Examples 1, 2 and 4. These results in Comparative Examples 1, 2 and 4 are caused by the exit light in a transmission mode which exited in a direction reverse to the light source so as to hardly contribute to display because of poor frontal luminance. Particularly in Comparative Examples 1 and 4, exit light ran short in all directions. In Comparative Example 3, light in the vicinity of the light source was so intensive that uniformity of brightness on the whole display screen was inferior as well as display in a reflection mode was dark. On the other hand, in Example 4, improvement of luminance by use of the two light sources was remarkable. It is apparent that more brightness was obtained in Example 4 in comparison with the side-lighting type light pipe in Comparative Example 5. Incidentally, in the system using the side-lighting type light pipe in Comparative Example 5, increase of thickness due to the light pipe was remarkable, so that it was difficult to reduce the thickness.

In each of Examples and Comparative Examples, good display quality was obtained in a transmission mode because there was no problem on visibility in the condition that a voltage was applied to the liquid-crystal cell. In a reflection mode in Comparative Example 5, display was seen as if it was in the deep and was not easy to view because display was performed by the reflection surface through the light pipe. On the other hand, the case where the light diffusing sheet was removed in Example 2 was inferior in visibility but equal in frontal luminance in a transmission mode to the case where the light diffusing sheet was provided. In a reflection mode, there is no particular problem except that slight stripes caused by the optical path changing means were viewed. It is proved from the above description that a reflection-transmission double type liquid-crystal display device excellent in display quality can be formed according to the present invention while increase in volume and weight due to the light pipe is avoided so that reduction in thickness and weight is achieved by a sheet method.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A reflection-transmission double type liquid-crystal display device comprising:

a transmission type liquid-crystal display panel including a liquid-crystal cell;

at least one illuminator disposed on at least one of side surfaces of said liquid-crystal display panel and capable of being switched on/off;

an optical path changing sheet which has a refractive index exhibiting a refractive index difference of not higher than 0.15 from a refractive index of a nearest liquid-crystal cell substrate, and which is bonded onto a back side opposite to a visual side of said liquid-crystal display panel through an adhesive layer having a refractive index exhibiting a refractive index difference of not higher than 0.20 from the refractive index of said nearest liquid-crystal cell substrate; and a reflection layer disposed on a back side of said optical path changing sheet, wherein said optical path changing sheet has continuous first optical path changing slopes, second optical path changing slopes and flat surfaces, each of said first optical path changing slopes faces said illuminator at an inclination angle in a range of from 30 to 48 degrees with respect to a plane of said optical path changing sheet for reflecting incident light from said illuminator toward said visual side of said liquid-crystal display panel, each of said second optical path changing slopes faces away from said illuminator at an inclination angle which is less than 90 degrees with respect to a plane of said optical path changing sheet and is greater than said inclination angle of said first optical path changing slopes, and each of said flat surfaces is inclined at an inclination angle of not larger than 10 degrees with respect to said sheet plane so that a projected area of said flat surfaces on said sheet plane is not smaller than 10 times as large as a projected area of said first optical path changing slopes on said sheet plane.

2. A reflection-transmission double type liquid-crystal display device according to claim 1, wherein said liquid-crystal display panel further includes a polarizer disposed on one or each of side surfaces of said liquid-crystal cell.

3. A reflection-transmission double type liquid-crystal display device according to claim 2, wherein said liquid-crystal display panel further includes at least one phase retarder disposed between said liquid-crystal cell and said polarizer.

4. A reflection-transmission double type liquid-crystal display device according to claim 1, wherein each of cell substrates for said liquid-crystal cell is made of an optically isotropic material.

5. A reflection-transmission double type liquid-crystal display device according to claim 1, wherein said first optical path changing slopes are inclined at an angle of not larger than 30 degrees with respect to said side surface on which said illuminator is disposed; and said optical path changing sheet is disposed so that said optical-path-changing-slope-forming surface of said optical path changing sheet is located on said back side of said optical path changing sheet.

6. A reflection-transmission double type liquid-crystal display device according to claim 1, wherein a refractive index difference between said adhesive layer and said nearest liquid-crystal cell substrate and between said optical path changing sheet and said nearest liquid-crystal cell substrate is not larger than 0.10.

7. A reflection-transmission double type liquid-crystal display device according to claim 1, wherein said first optical path changing slopes inclined at an inclination angle of from 35 to 46 degrees with respect to said sheet plane.

8. A reflection-transmission double type liquid-crystal display device according to claim 7, wherein each of said prismatic structures of said optical path changing sheet is constituted by a concave portion substantially shaped like a triangle in section.

9. A reflection-transmission double type liquid-crystal display device according to claim 7, wherein said prism-like concave portions are constituted by continuous grooves extended from one end of said optical path changing sheet to the other end thereof in a ridgeline direction parallel to or inclined to said side surface of said liquid-crystal display panel on which said illuminator is disposed.

10. A reflection-transmission double type liquid-crystal display device according to claim 1, wherein light reflected by said reflection layer is diffused so as to be made incident on said liquid-crystal cell.

11. A reflection-transmission double type liquid-crystal display device according to claim 10, wherein at least said reflection layer, said optical path changing sheet or said adhesive layer for bonding said reflection layer to said liquid-crystal display panel exhibits light diffusing characteristic.

12. A reflection-transmission double type liquid-crystal display device according to claim 11, wherein said light diffusion type reflection layer has a rough surface of fine prismatic structures, and a high-reflectance metal thin film disposed on said rough surface of fine prismatic structures, or wherein a light diffusing layer is disposed on an optical-path-changing-sheet-side surface of said high-reflectance metal thin film.

13. A reflection-transmission double type liquid-crystal display device according to claim 11, wherein said reflection layer comprises a high-reflectance metal thin film which is provided onto an optical-path-changing-slope-forming surface of said optical path changing sheet, the optical-path-changing-slope-forming surface being roughened, or onto an optical-path-changing-slope-forming surface of a light diffusion type optical path changing sheet; or
wherein said reflection layer comprises a high-reflectance metal thin film which is provided onto an optical-path-changing-slope-forming surface of said optical path changing sheet, said optical path changing sheet being bonded through a light diffusion type adhesive layer.

14. A reflection-transmission double type liquid-crystal display device comprising:
a transmission type liquid-crystal display panel including a liquid-crystal cell;
at least one illuminator disposed on at least one of side surfaces of said liquid-crystal display panel and capable of being switched on/off;
an optical path changing sheet which has a refractive index exhibiting a refractive index difference of not higher than 0.15 from a refractive index of a nearest liquid-crystal cell substrate, and which is bonded onto a back side opposite to a visual side of said liquid-crystal display panel through an adhesive layer having a refractive index exhibiting a refractive index difference of not higher than 0.20 from the refractive index of said nearest liquid-crystal cell substrate; and
a reflection layer disposed on a back side of said optical path changing sheet,
wherein said optical path changing sheet has optical path changing slopes and flat surfaces, each of said optical path changing slopes faces said illuminator at an inclination angle in a range of from 30 to 48 degrees with respect to a plane of said optical path changing sheet for reflecting incident light from said illuminator toward said visual side of said liquid-crystal display panel, and each of said flat surfaces is inclined at an inclination angle of not larger than 10 degrees with respect to said sheet plane so that a projected area of said flat surfaces on said sheet plane is not smaller than 10 times as large as a projected area of said optical path changing slopes on said sheet plane,
wherein said optical path changing sheet includes a repetitive structure of prismatic structures having optical path changing slopes inclined at an inclination angle of from 35 to 46 degrees with respect to said sheet plane,
wherein said prism-like concave portions are constituted by discontinuous grooves each of which has a length of not smaller than 5 times as large as a depth of said groove and in which a longitudinal direction of said groove is substantially parallel to said side surface of said liquid-crystal display panel on which said illuminator is disposed.

15. A reflection-transmission double type liquid-crystal display device comprising:
a transmission type liquid-crystal display panel including a liquid-crystal cell;
at least one illuminator disposed on at least one of side surfaces of said liquid-crystal display panel and capable of being switched on/off;
an optical path changing sheet which has a refractive index exhibiting a refractive index difference of not higher than 0.15 from a refractive index of a nearest liquid-crystal cell substrate, and which is bonded onto a back side opposite to a visual side of said liquid-crystal display panel through an adhesive layer having a refractive index exhibiting a refractive index difference of not higher than 0.20 from the refractive index of said nearest liquid-crystal cell substrate; and
a reflection layer disposed on a back side of said optical path changing sheet,
wherein said optical path changing includes a plurality of continuous and adjacent, first and second optical path changing slopes, each of said first optical path changing slopes faces said illuminator at an inclination angle in a range of from 30 to 48 degrees with respect to a plane of said optical path changing sheet for reflecting incident light from said illuminator toward said visual side of said liquid-crystal display panel, each of said second optical path changing slopes faces away from said illuminator at an inclination angle of not larger than 10 degrees with respect to said sheet plane so that a projected area of said second optical path changing slopes on said sheet plane is not smaller than 10 times as large as a projected area of said first optical path changing slopes on said sheet plane.

16. A reflection-transmission double type liquid-crystal display device comprising:
- a transmission type liquid-crystal display panel including a liquid-crystal cell;
- at least one illuminator disposed on at least one of side surfaces of said liquid-crystal display panel and capable of being switched on/off;
- an optical path changing sheet which has a refractive index exhibiting a refractive index difference of not higher than 0.15 from a refractive index of a nearest liquid-crystal cell substrate, and which is bonded onto a back side opposite to a visual side of said liquid-crystal display panel through an adhesive layer having a refractive index exhibiting a refractive index difference of not higher than 0.20 from the refractive index of said nearest liquid-crystal cell substrate; and
- a reflection layer disposed on a back side of said optical path changing sheet, wherein said optical path changing sheet has a plurality of optical path changing means having a concave shape formed by first and second optical path changing slopes and flat surfaces interposed between said first and second optical path changing slopes, each of said first optical path changing slopes faces said illuminator at an inclination angle in a range of from 30 to 48 degrees with respect to a plane of said optical path changing sheet for reflecting incident light from said illuminator toward said visual side of said liquid-crystal display panel, each of said second optical path changing slopes faces away from said illuminator, and each of said flat surfaces is inclined at an inclination angle of not larger than 10 degrees with respect to said sheet plane.

* * * * *